(12) United States Patent
Sekizuka

(10) Patent No.: US 11,192,506 B2
(45) Date of Patent: Dec. 7, 2021

(54) VEHICLE CABIN PARTITIONING DEVICE

(71) Applicant: Toyota Jidosha Kabushiki Kaisha, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/861,607

(22) Filed: Apr. 29, 2020

(65) Prior Publication Data

US 2020/0377041 A1 Dec. 3, 2020

(30) Foreign Application Priority Data

May 28, 2019 (JP) .............................. JP2019-099521

(51) Int. Cl.
*B60R 13/08* (2006.01)
*B60N 2/90* (2018.01)

(52) U.S. Cl.
CPC ............ *B60R 13/0823* (2013.01); *B60N 2/91* (2018.02)

(58) Field of Classification Search
CPC ......... B60R 13/0823; B60R 2011/0019; B60R 2011/008; B60R 2011/0082; B60R 2011/0084; B60R 2011/0092; B60R 21/06; B60R 21/08; B60R 21/09; B60R 21/12; B60N 2/91
USPC ....................................................... 296/24.46
See application file for complete search history.

(56) References Cited

U.S. PATENT DOCUMENTS

| | | | | |
|---|---|---|---|---|
| 4,621,856 A | * | 11/1986 | McKenzie | B60R 21/026 280/749 |
| 4,738,480 A | * | 4/1988 | Ward | B60R 21/026 296/24.41 |
| 5,238,282 A | * | 8/1993 | Watson | B60H 1/00592 296/24.41 |
| 6,105,653 A | * | 8/2000 | Armstrong | B60H 1/00592 160/120 |

(Continued)

FOREIGN PATENT DOCUMENTS

| | | | | |
|---|---|---|---|---|
| DE | 102018006639 A1 | * | 2/2020 | ........... B60R 21/026 |
| FR | 2985480 A1 | * | 7/2013 | ............... B60N 2/91 |

(Continued)

OTHER PUBLICATIONS

Machine translation of FR 480 (Year: 2013).*

*Primary Examiner* — Hilary L Gutman
(74) *Attorney, Agent, or Firm* — Dinsmore & Shohl LLP

(57) ABSTRACT

A partition provided between a pair of vehicle seats arranged to face each other in a vehicle cabin is provided to extend from an upper part to a lower part of the vehicle cabin in a partitioning state. Therefore, the partition in the partitioning state can block respective visual lines of occupants seated in the pair of vehicle seats. Since the partition in the non-partitioning state is accommodated in a predetermined position, by setting the partition to the non-partitioning state when the occupant is seated on only one side of the pair of vehicle seats or the like, the occupant can obtain a feeling of openness. The partition can be selectively switched between the partitioning state and the non-partitioning state by an operation switch. Accordingly, it is possible to secure a private space for allowing the occupant to have a comfortable state or a relaxed state inside the vehicle cabin.

18 Claims, 11 Drawing Sheets

(56) References Cited

U.S. PATENT DOCUMENTS

| | | | |
|---|---|---|---|
| 9,956,898 B1* | 5/2018 | Dellock | B60K 37/04 |
| 10,046,685 B1* | 8/2018 | Bryant | E06B 9/42 |
| 10,717,358 B2* | 7/2020 | Patil | B60K 35/00 |
| 10,800,305 B2* | 10/2020 | Sanchez | B60Q 3/20 |
| 2001/0033084 A1* | 10/2001 | Murray | B60J 1/2011 |
| | | | 296/24.46 |
| 2016/0046215 A1* | 2/2016 | Lebowitz | B60N 2/91 |
| | | | 296/24.46 |
| 2017/0334313 A1* | 11/2017 | Ahn | B60N 2/2222 |
| 2018/0312082 A1* | 11/2018 | Lalague | B60N 2/91 |
| 2018/0312127 A1* | 11/2018 | Lalague | B62D 33/046 |
| | | | 296/24 R X |
| 2018/0319344 A1* | 11/2018 | Fleischhacker | B60R 5/047 |
| 2019/0100151 A1* | 4/2019 | Tait | B60R 21/06 |
| 2019/0106021 A1* | 4/2019 | Dietrich | B60N 2/0224 |
| 2019/0202377 A1* | 7/2019 | Mizutani | B62D 31/025 |
| 2019/0225167 A1* | 7/2019 | Takamura | B62D 31/00 |
| 2019/0281340 A1* | 9/2019 | Sacra | B60K 35/00 |
| 2020/0047692 A1* | 2/2020 | Park | G06Q 30/0283 |
| 2020/0108698 A1* | 4/2020 | Sakurai | B60J 1/2036 |

FOREIGN PATENT DOCUMENTS

| | | | | |
|---|---|---|---|---|
| FR | 3070940 A1 * | 3/2019 | | B60R 13/0823 |
| JP | 2000-255355 A | 9/2000 | | |
| JP | 2007-314158 A | 12/2007 | | |
| JP | 2018-203227 A | 12/2018 | | |

* cited by examiner

VEHICLE CABIN PARTITIONING DEVICE

CROSS-REFERENCE TO RELATED APPLICATIONS

This application claims priority to Japanese Patent Application No. 2019-099521 filed on May 28, 2019, which is incorporated herein by reference in its entirety including the specification, drawings and abstract.

BACKGROUND

1. Technical Field

The present disclosure relates to a vehicle cabin partitioning device.

2. Description of Related Art

The following Japanese Patent Application Publication No. 2018-203227 (JP 2018-203227 A) discloses an disclosure relating to a vehicle cabin partitioning system. In this vehicle cabin partitioning system, a vehicle cabin is partitioned by a screen in at least one of the vehicle longitudinal direction and the vehicle width direction. Therefore, when passengers who do not know each other are seated in a front vehicle seat and a rear vehicle seat, or passengers who do not know each other are seated in vehicle seats adjacent to each other in the vehicle width direction in ride sharing, a private space can be secured for each vehicle seat.

SUMMARY

In the meantime, in the configuration disclosed in JP 2018-203227 A, the respective vehicle seats are arranged in the same direction toward the vehicle front side. Therefore, when a comfortable state in which the seat back of the front vehicle seat is greatly reclined or a relaxed state in which the seat back of the front vehicle seat is greatly slid toward the vehicle rear side is taken, the screen may interfere with the vehicle seats, so that there is a risk that the screen that partitions the vehicle cabin in the vehicle front-rear direction cannot be used. Furthermore, the configuration disclosed in JP 2018-203227 A does not disclose a method of operating the screen or operation means of the screen, and thus the above-described related art has room for improvement in the above points.

The present disclosure has been made in light of the above circumstances, and an object of the present disclosure is to provide a vehicle cabin partitioning device that can easily secure a private space that allows a passenger to have a comfortable state or a relaxed state in a vehicle cabin.

A vehicle cabin partitioning device according to the disclosure as set forth in a first aspect, includes: a partition provided in a vehicle cabin, the partition selectively shifting between a partitioning state of partitioning a pair of vehicle seats arranged to face each other and a non-partitioning state of being accommodated in a predetermined position; and an operation unit provided at a position visible and operable for an occupant seated in the vehicle seat, the operation unit being configured to switch the partition between the partitioning state and the non-partitioning state.

According to the disclosure as set forth in the first aspect, the partition provided in the vehicle cabin partitions the pair of vehicle seats arranged to face each other in the partitioning state. Therefore, even when the pair of vehicle seats facing each other is respectively set in a comfortable state in which the seat back of one vehicle seat is greatly reclined and in a relaxed state in which the other vehicle seat is slid so as to widen a foot space when the occupant is seated in this vehicle seat, the partition in the partitioning state is unlike to interfere with these vehicle seats, and thus a private space for each vehicle seat can be secured by the partition in the partitioning state. Since the partition in the non-partitioning state is accommodated in a predetermined position, when the occupant is seated in only one of the pair of vehicle seats or the like, the partition can be set to the non-partitioning state such that the occupant can obtain a feeling of openness. The partition can be selectively switched between the partitioning state and the non-partitioning state by the operation switch. The operation unit is provided at a position where the occupant seated in the vehicle seat can visually recognize and operate the switch; therefore the occupant can easily switch the partition between the partitioning state and the non-partitioning state.

Here, the term "visible" means that the occupant seated in the vehicle seat can visually observe an object all the time when the occupant operates the object.

The vehicle cabin partitioning device according to the present disclosure as set forth in a second aspect is configured, in the disclosure of the first aspect, such that the partition in the non-partitioning state is accommodated in a ceiling of the vehicle cabin, and the partition in the partitioning state extends from the ceiling to a floor of the vehicle cabin.

According to the disclosure as set forth in the second aspect, since the partition is provided to extend from the ceiling to the floor of the vehicle cabin in the partitioning state, visual lines of the occupants sated in the respective vehicle seats can be blocked from each other and the spaces at their feet can be partitioned at the same time. Therefore, it is possible to more clearly separate the private spaces in the respective vehicle seats from each other. Further, since the partition is accommodated in the ceiling of the vehicle cabin in the non-partitioning state, the partition can be shifted to the partitioning state using gravity; therefore, the operation mechanism of the partition can be simplified.

The vehicle cabin partitioning device according to the present disclosure as set forth in a third aspect is configured, in the disclosure of the first aspect, such that the partition is accommodated in one side wall portion of the vehicle cabin in the non-partitioning state, and extends from the one side wall portion to the other side wall in the partitioning state.

According to the disclosure as set forth in the third aspect, since the partition extends from one side wall portion to the other side wall portion of the vehicle cabin in the partitioning state, movement of an occupant from one private space to the other private space facing can be restrained. In addition, the partition is stored to the one side wall portion of the vehicle cabin in the non-partitioning state; therefore, even when the ceiling height of the vehicle is low, it is possible to suppress the space above the occupant's head from being reduced.

The vehicle cabin partitioning device according to the present disclosure as set forth in a fourth aspect is configured, in the disclosure of the third aspect, such that the one side wall portion is configured to be a side wall portion having no vehicle door.

According to the disclosure as set forth in the fourth aspect, the partition can be stored to one of the side wall portions, which has no vehicle door. Therefore, the storage location of the partition can be easily secured.

The vehicle cabin partitioning device according to the present disclosure as set forth in a fifth aspect is configured, in the disclosure of any one of the first aspect to the fourth aspect, such that the operation unit is provided on at least a side wall portion of the vehicle cabin.

According to the disclosure as set forth in the fifth aspect, since the operation unit is provided on at least the side wall portion of the vehicle cabin, the operation unit relatively easily enters the field of view of the occupant seated in the vehicle seat, which facilitates the operation of the operation unit.

The vehicle cabin partitioning device according to the present disclosure as set forth in a sixth aspect is configured, in the disclosure of any one of the first aspect to the fifth aspect, such that the partition selectively shifts between the partitioning state and the non-partitioning state for each pair of seating positions arranged to face each other among a plurality seating positions in the vehicle cabin.

According to the disclosure as set forth in the sixth aspect, among the plurality of seating positions in the vehicle cabin, the partition can be selectively set between the partitioning state and the non-partitioning state for each pair of seating positions that face each other; therefore, the partitioning state can be set for one pair of seating positions and the non-partitioning state can be set for another pair of seating positions. That is, when one occupant who desires to secure a private space and another occupant who desires to communicate with others are mixed, the vehicle cabin can be set to an appropriate condition in accordance with the respective requests of the occupants.

The term "seating position" denotes a position in the vehicle seat where an occupant can be seated; and generally, an independent vehicle seat (so-called captain seat) has a single seating position, and a chaise-shaped vehicle seat (a so-called bench seat) has a plurality of seating positions.

The vehicle cabin partitioning device according to the present disclosure as set forth in a seventh aspect is configured, in the disclosure of the sixth aspect, such that the operation unit is provided at a position corresponding to each of the seating positions.

According to the disclosure as set forth in the seventh aspect, since the operation switch is provided at a position corresponding to each of the seating positions of the vehicle seats, each occupant seated at each seating position can operate the partition into a desired state.

The vehicle cabin partitioning device according to the present disclosure as set forth in an eighth aspect is configured, in the disclosure of any one of the first aspect to the seventh aspect, such that as viewed in a direction perpendicular to the plane of the partition, at least a part of the partition overlaps with a guide rail provided to extend along an extending direction of the partition in the partitioning state, and the partition is movable along the guide rail.

According to the disclosure as set forth in the eighth aspect, the partition at least partially overlaps with the guide rail extending along the extending direction of the partition in the partitioning state as viewed in a direction perpendicular to the plane of the partition, so that the partition is movable along the guide rail, and thus the displacement of the partition in the direction perpendicular to the plane of the partition is restrained by the guide rail when the partition moves. Thereby, the operation of the partition can be stabilized. In addition, fluttering of the partition when the partition is in the partitioning state can be reduced by the guide rail.

The vehicle cabin partitioning device according to the present disclosure as set forth in a ninth aspect is configured, in the disclosure of any one of the first aspect to the eighth aspect, such that an end on a vehicle lower side of the partition in the partitioning state is retainable on a floor of the vehicle cabin.

According to the disclosure as set forth in the ninth aspect, since the end of the partition on the vehicle lower side can be retained on the floor of the vehicle cabin in the partitioning state, it is possible to restrain the partition in the partitioning state from fluttering, which is caused by a load input from the legs of the occupant or by the inertia during the traveling of the vehicle.

The vehicle cabin partitioning device according to the present disclosure as set forth in a tenth aspect is configured, in the disclosure of any one of the first aspect to the ninth aspect, such that the partition is accommodatable inside a case provided to extend in a seat width direction, and the case is attached to a vehicle frame at a plurality of positions in a longitudinal direction of the case.

According to the disclosure as set forth in the tenth aspect, the partition is accommodatable inside the case. This case extends in the seat width direction, and is attached to the vehicle body frames at a plurality of positions in its longitudinal direction. That is, the vehicle body frames can be connected to each other by the case.

The vehicle cabin partitioning device according to the present disclosure as set forth in the first aspect has an effect that can easily secure a private space in the vehicle cabin that allows the occupant to take a comfortable state or a relaxed state.

The vehicle cabin partitioning device according to the present disclosure as set forth in the second aspect has an effect that can enhance the privacy and reduce the production cost.

The vehicle cabin partitioning device according to the present disclosure as set forth in the third aspect has an effect that can enhance the privacy and reduce a feeling of pressure felt by the occupant.

The vehicle cabin partitioning device according to the present disclosure as set forth in the fourth aspect has an effect that can improve the design flexibility.

The vehicle cabin partitioning device according to the present disclosure as set forth in the fifth aspect has an effect that can promote enhancement of the operability.

The vehicle cabin partitioning device according to the present disclosure as set forth in the sixth aspect has an effect that can realize a detailed support for a condition requested by the occupants.

The vehicle cabin partitioning device according to the present disclosure as set forth in the seventh aspect has an effect that can enhance the convenience.

The vehicle cabin partitioning device according to the present disclosure as set forth in eighth aspect has an effect that can cope with both improvement in stability in the motion and improvement in NV (noise and vibration, hereinafter simply referred to as "NV") performance.

The vehicle cabin partitioning device according to the present disclosure as set forth in the ninth aspect has an effect that can improve the NV performance.

The vehicle cabin partitioning device according to the present disclosure as set forth in the tenth aspect has an effect that can improve the bending rigidity of the vehicle body frames.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, the first embodiment of a vehicle cabin partitioning device 10 according to the present disclosure will be described with reference to FIG. 1 to FIG. 10.

Overall Configuration

Figure 1:
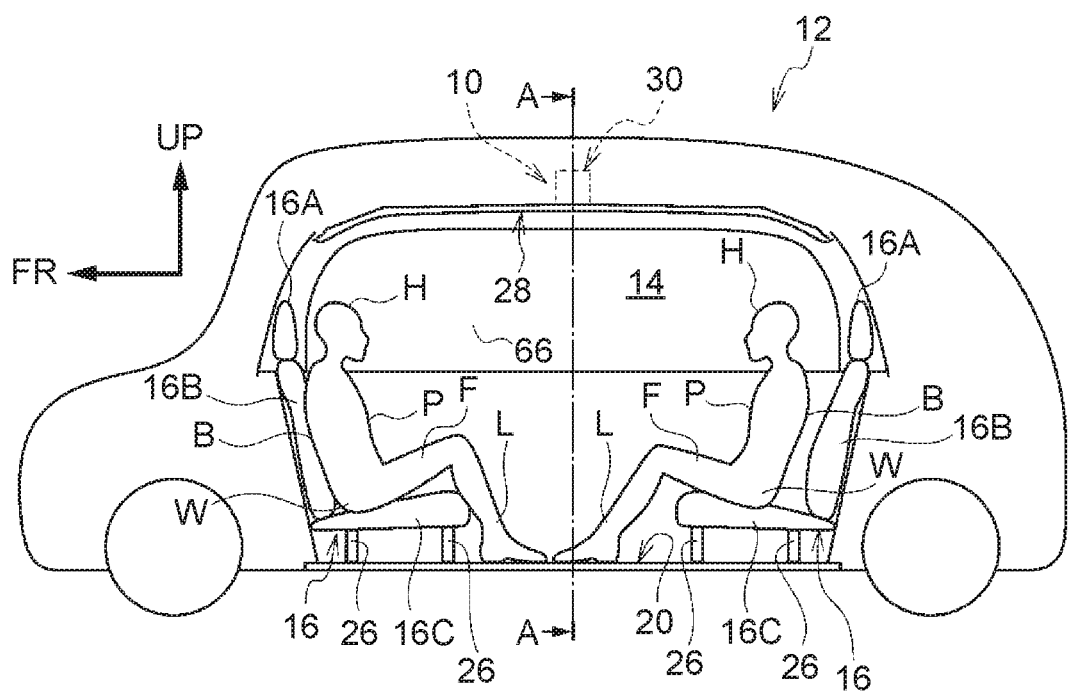
FIG. 1 is a side view schematically showing a vehicle cabin of a vehicle having a vehicle cabin partitioning device according to a first embodiment.
Figure 2:
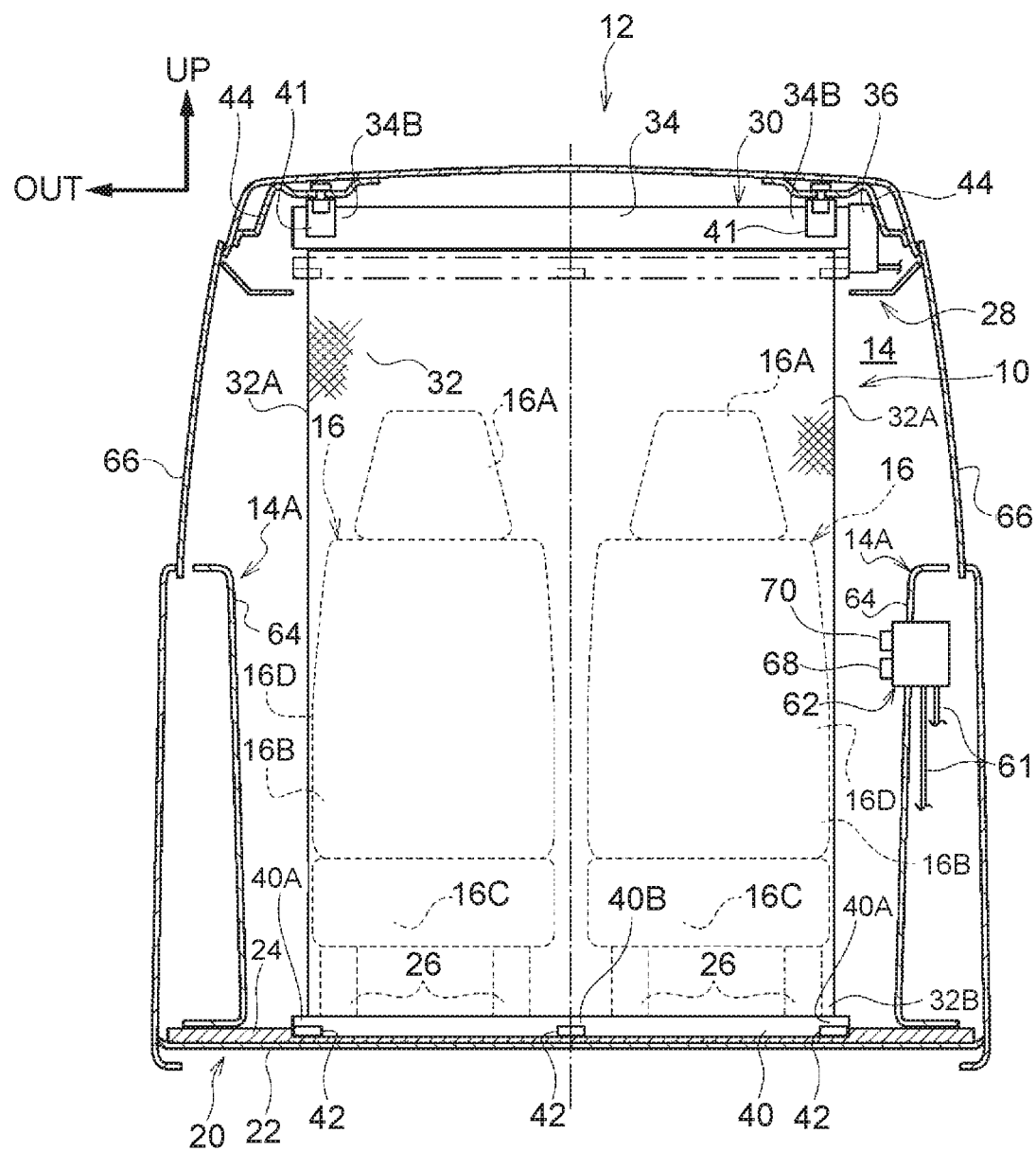
FIG. 2 is a schematic enlarged sectional view showing a partitioning state of the vehicle cabin partitioning device according to the first embodiment taken along line A-A in FIG. 1.

As shown in FIG. 1, a vehicle 12 having the vehicle cabin partitioning device 10 is, for example, an autonomous vehicle, and has no driver's seat in a vehicle cabin 14, and pairs of vehicle seats 16 facing each other in the vehicle front-rear direction are provided adjacent to each other in the vehicle width direction (see FIG. 2). Each vehicle seat 16 includes a headrest 16A for supporting a head H of an occupant P seated in the vehicle seat, a seat back 16B for supporting a back B of the occupant P, and a seat cushion 16C for supporting a waist W (including buttocks in this case) and thighs F of the occupant P. In other words, each seat cushion 16C corresponds to each of the seating positions of the vehicle seats 16, and as the seating positions in the vehicle cabin 14, a pair of seating positions is provided in the vehicle front-rear direction and a pair of seating positions is provided in the vehicle width direction, respectively.

As shown in FIG. 2, a floor 20 of the vehicle 12 includes a floor panel 22 made of steel, and a floor carpet 24 having a fiber layer on the vehicle cabin 14 side. The floor carpet 24 is placed on the floor panel 22, and is formed with cutouts (not shown) at positions corresponding to mounted legs 26 of the vehicle seat 16. Thus, the mounted legs 26 of the vehicle seat 16 are directly mounted on the floor panel 22.

Partitioning Unit

A ceiling 28 of the vehicle cabin 14 is provided with a partitioning unit 30. The partitioning unit 30 includes a partition 32, a partition accommodating case 34 as a case, a partition driving mechanism 36, and a partition spool 38 (see FIG. 4). The partition 32 is formed in a rectangular shape having its thickness direction in the vehicle front-rear direction and its longitudinal direction in the vehicle height direction, and is made of a nontransparent and flexible material (for example, a vinyl sheet, etc.). An outer end 32A in the vehicle width direction of the partition 32 is arranged at a position corresponding to an outer end 16D in the vehicle width direction of the vehicle seat 16, in a front view. The dimension in the vehicle height direction of the partition 32 is set to be not less than a dimension from the ceiling 28 to the floor 20 of the vehicle cabin 14.

A partition lower end bar 40 is provided on a lower end 32B of the partition 32. The partition lower end bar 40 is formed of a prism member (see FIG. 3) having its longitudinal direction in the vehicle width direction, and the lower end 32B of the partition 32 is locked inside the partition lower end bar 40 by a locking configuration (not shown) (see FIG. 5). The partition lower end bar 40 is provided with a plurality of locking tools 42 arranged with a distance from each other in the longitudinal direction. Specifically, the locking tools 42 are provided at both longitudinal end portions 40A on the vehicle lower side of the partition lower end bar 40 and at a longitudinal middle portion 40B on the vehicle lower side of the partition lower end bar 40, respectively. As an example, each locking tool 42 is formed of a member having magnetism, and when the partition lower end bar 40 abuts on the floor carpet 24, the locking tools 42 are locked to the floor panel 22 via the floor carpet 24 by magnetic force.

Figure 5:
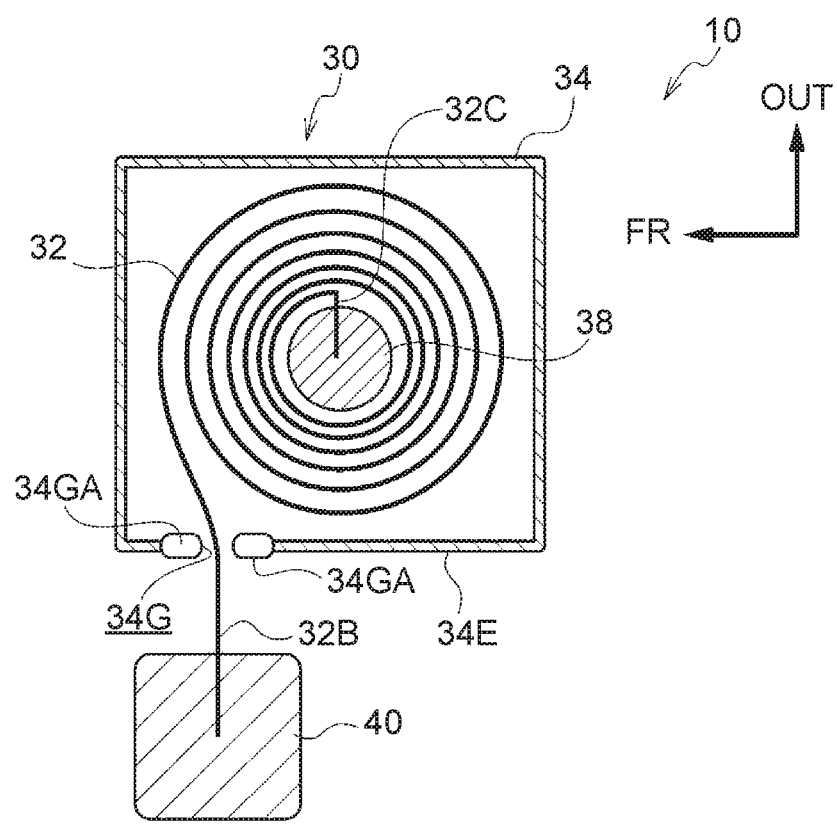
FIG. 5 is an enlarged sectional view showing a state taken along line B-B in FIG. 4.

An upper end 32C of the partition 32 is locked to the partition spool 38 (see FIG. 5). Specifically, the partition spool 38 is accommodated inside the partition accommodating case 34 and is formed in a columnar shape having its axial direction in the vehicle width direction, and an upper end 32C of the partition 32 inserted inside in the radial direction is locked by a locking tool (not shown).

Figure 4:
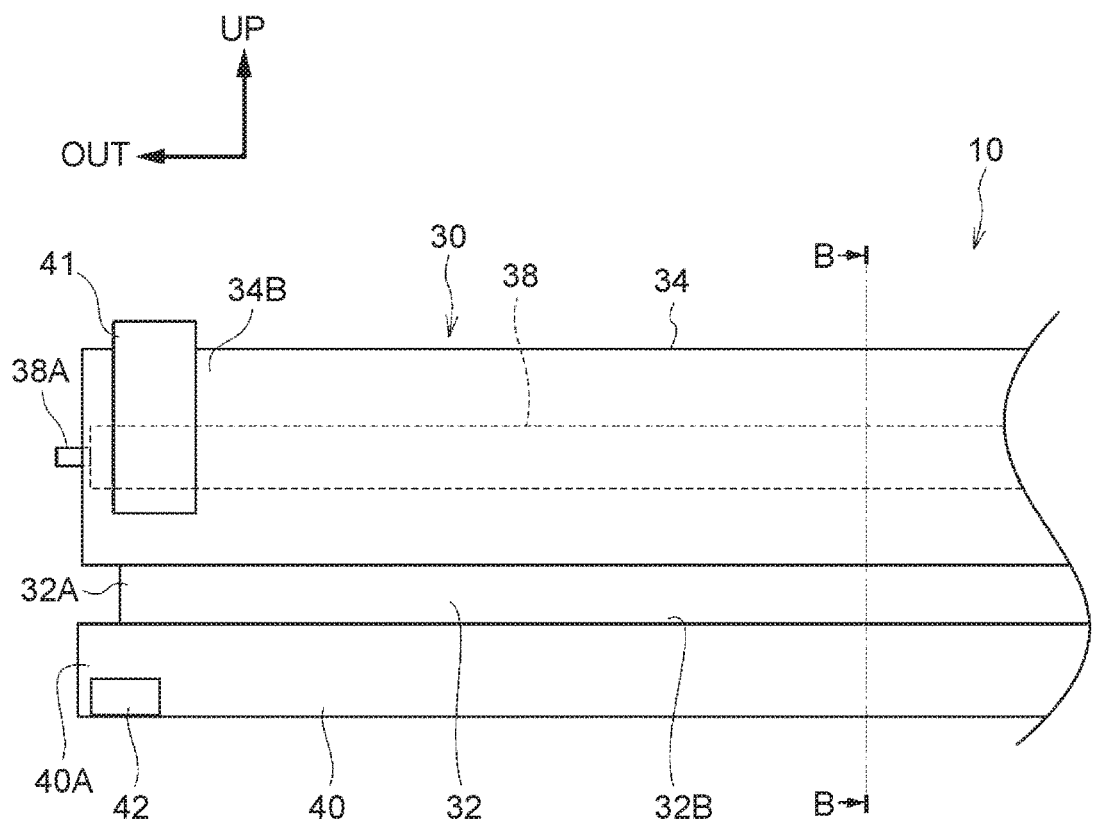
FIG. 4 is a front view showing the non-partitioning state of the vehicle cabin partitioning device according to the first embodiment.

As shown in FIG. 4, both longitudinal ends of the partition spool 38 are integrally formed with rotating shafts 38A each formed in a columnar shape and having the same axial direction as that of the partition spool 38 such that the rotating shafts 38A protrude from the partition spool 38 outward in the vehicle width direction. Each rotating shaft 38A has a smaller diameter than that of the partition spool 38 and is set to protrude outward from the partition accommodating case 34 in the vehicle width direction.

The partition accommodating case 34 is formed of a steel rectangular tube member (see FIG. 5) having its longitudinal direction in the vehicle width direction, and longitudinal end portions 34B of the partition accommodating case 34 are fastened respectively to a pair of left and right roof side rails 44 partially configuring vehicle body frames of the vehicle 12 via brackets 41 (see FIG. 2).

Figure 3:
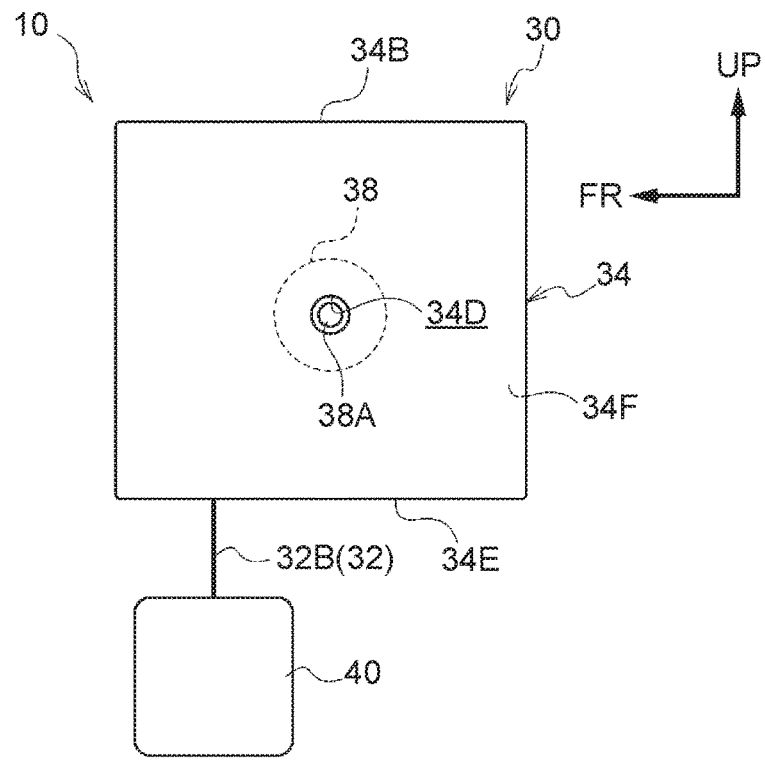
FIG. 3 is a side view showing a non-partitioning state of the vehicle cabin partitioning device according to the first embodiment.

As shown in FIG. 3, end wall portions 34F having its thickness direction in the vehicle width direction are provided at both end portions 34B of the partition accommodating case 34. Thereby, the both end portions 34B of the partition accommodating case 34 are closed by the end wall portions 34F. Each of the end wall portions 34F is formed with a through-hole 34D penetrating the end wall portion 34F in the thickness direction, and the rotating shafts 38A of the partition spool 38 accommodated inside the partition accommodating case 34 are inserted from the inner side in the vehicle width direction to the outer side in the vehicle width direction. Thereby, the partition spool 38 is rotatably supported, while having its axial direction in the vehicle width direction, by the partition accommodating case 34.

As shown in FIG. 5, a vehicle lower wall portion 34E of the partition accommodating case 34 is formed with a partition communication hole 34G. The partition communication hole 34G is formed to penetrate the vehicle lower wall portion 34E on one side (as an example, the vehicle front side in the present embodiment) in the vehicle front-rear direction, and a frame member 34GA is provided at an opening edge of the partition communication hole 34G. The partition 32 is inserted through the partition communication hole 34G.

Figure 6:
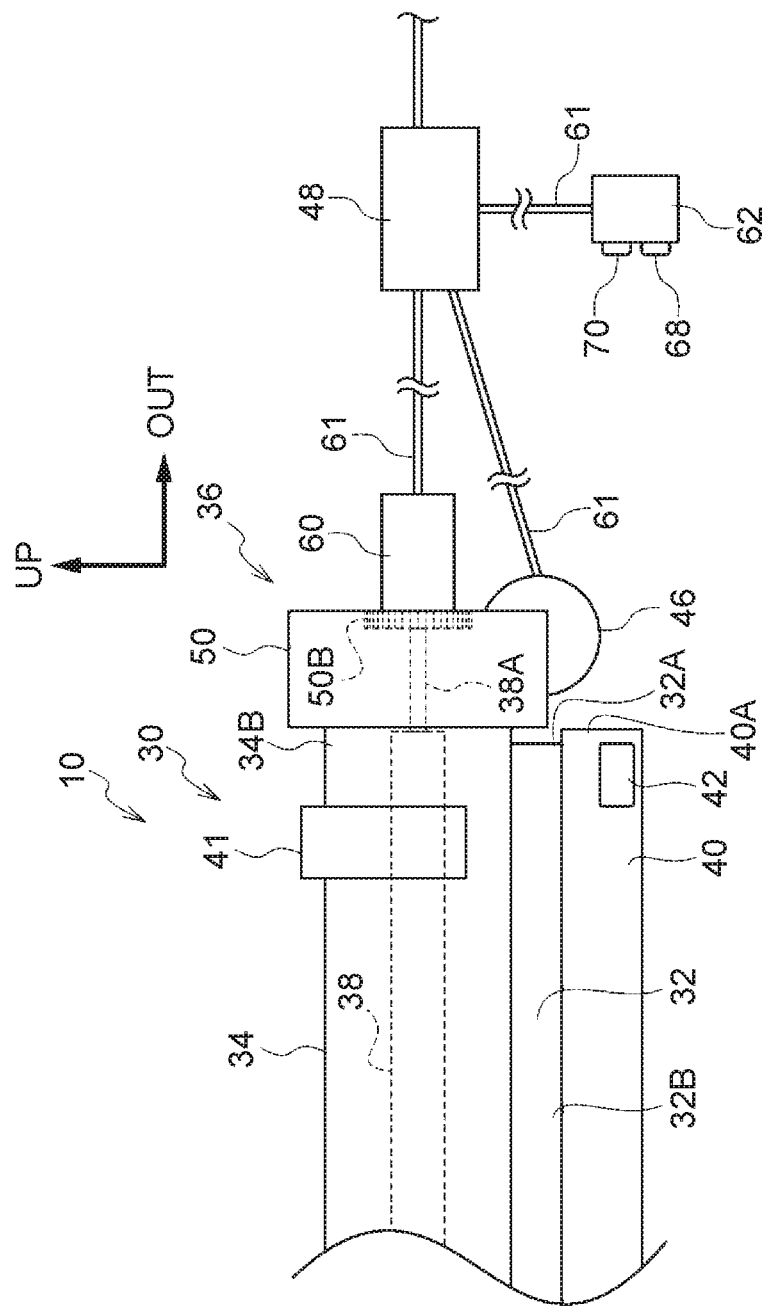
FIG. 6 is a front view schematically showing an operation mechanism of the vehicle cabin partitioning device according to the first embodiment.
Figure 7:
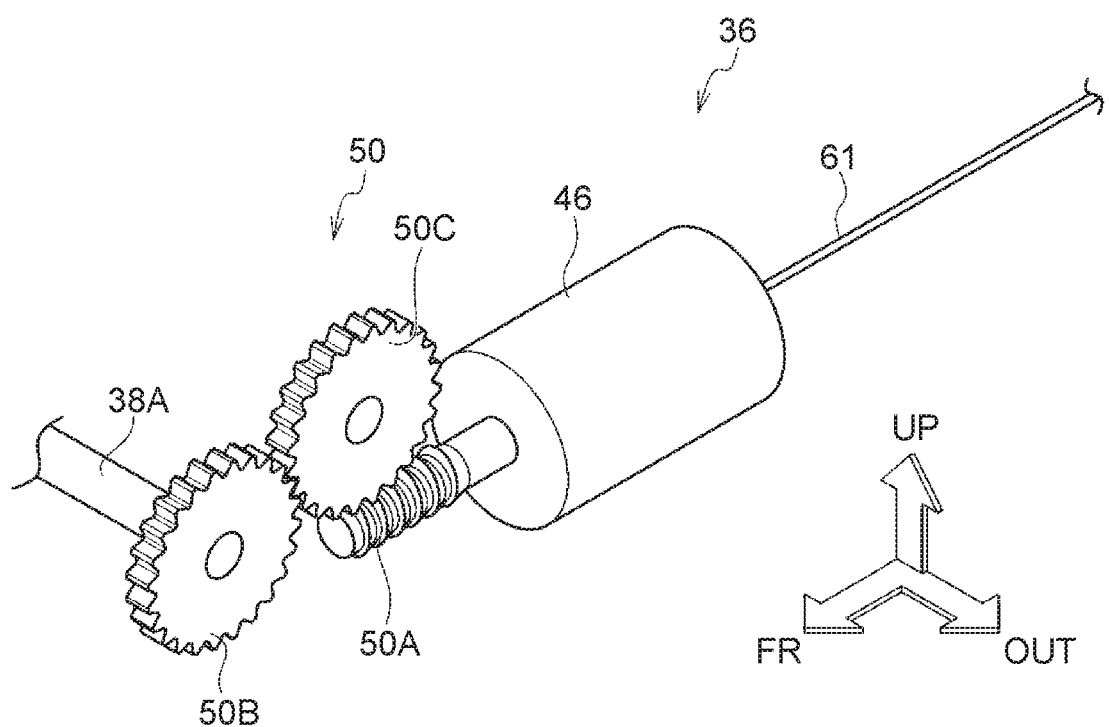
FIG. 7 is a schematic perspective view showing a major part of the operation mechanism of the vehicle cabin partitioning device according to the first embodiment.

As shown in FIG. 6, a partition driving mechanism 36 is provided at the end portion 34B on one side in the vehicle width direction of the partition accommodating case 34. The partition driving mechanism 36 includes a motor 46, a control ECU 48, a gear mechanism 50, and a potentiometer 60. As shown in FIG. 7, the motor 46 is configured to be rotatable about its axial direction in the vehicle front-rear direction, and is connected to the control ECU 48 by a harness 61 (see FIG. 6).

The gear mechanism 50 includes a plurality of gears 50A, 50B, 50C. The gear 50A is a so-called worm gear formed on a rotating shaft of the motor 46. The gear 50B is a so-called spur gear combined to the rotating shaft 38A on one side in the vehicle width direction of the partition spool 38 (see FIG. 6). The gear 50C is a so-called spur gear rotatably provided between the gear 50A and the gear 50B, and transmits the rotation of the gear 50A to the gear 50B. Thus, the rotation of the motor 46 can be transmitted to the rotating shaft 38A and further to the partition spool 38 so as to rotate the partition spool 38.

As shown in FIG. 6, the potentiometer 60 is provided outward of the gear 50B in the vehicle width direction, and is capable of detecting an angle θ with respect to a reference position about the axis of the gear 50B as well as the partition spool 38. The potentiometer 60 is connected to the control ECU 48 by the harness 61.

The control ECU 48 includes a CPU (central processing unit), memories such as a ROM (read only memory) and a RAM (random access memory), a nonvolatile storage unit such as an HDD (hard disk drive) and an SSD (solid state drive), and a communication F/I (interface) (these are all not shown). The CPU, the memories, the storage unit, and the communication I/F are communicably connected to each other via a bus (not shown). The storage unit stores a partition operation program. The CPU executes the partition operation program through operation on an operation switch 62 as an operation unit described later, to thereby selectively switch the partition 32 between a partitioning state and a non-partitioning state.

Operation Switch

As shown in FIG. 2, the operation switch 62 is provided on one side of a pair of left and right center pillar garnishes 64 that partially configure side wall portions 14A of the vehicle cabin 14. The operation switch 62 is provided at a height at which the occupant P (see FIG. 1) seated in the vehicle seat 16 can visually recognize and operate this switch, specifically, the operation switch 62 is provided at a position near a side window glass 66 in the center pillar garnish 64 so as to be exposed to the vehicle cabin 14 side. The operation switch 62 is provided between the pair of vehicle seats 16 in the vehicle front-rear direction.

The operation switch 62 includes a partition pull-out switch 68 and a partition wind-up switch 70. The partition pull-out switch 68 and the partition wind-up switch 70 are respectively connected to the control ECU 48 via the harness 61 (see FIG. 6). The partition pull-out switch 68 and the partition wind-up switch 70 are, for example, push button switches each of which is turned on (energized) when the occupant P once pushes the button. Further, the partition pull-out switch 68 and the partition wind-up switch 70 are each provided with a mark (not shown) indicating a moving direction of the partition 32 when being turned on. Thereby, the occupant P can intuitively understand the operation.

Figure 8:
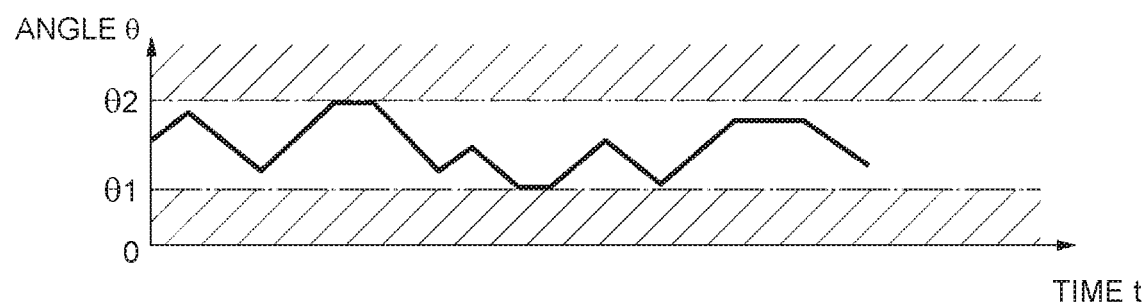
FIG. 8 is a graph showing a relationship between time and an angle of a partition spool in the operation of the vehicle cabin partitioning device according to the first embodiment.

The control ECU 48 rotates the motor 46 based on the angle θ of the partition spool 38 acquired from the potentiometer 60 and the operation of the operation switch 62. That is, as shown in FIG. 8, when the partition wind-up switch 70 (see FIG. 2) is turned on and the angle θ of the partition spool 38 is smaller than a wind-up reference angle θ2, the control ECU 48 rotates the motor 46 forward so as to increase the angle θ. In this case, the partition 32 is wound around the partition spool 38 (see FIG. 5) such that the partition 32 shifts to the non-partitioning state in which the partition 32 does not extend from the upper side to the lower side of the vehicle cabin 14. Note that the control ECU 48 keeps the motor 46 rotating forward until the angle θ of the partition spool 38 reaches the wind-up reference angle θ2 unless at least the partition pull-out switch 68 (see FIG. 2) is turned on while keeping the motor 46 rotating forward.

On the other hand, when the partition pull-out switch 68 is turned on and the angle θ of the partition spool 38 is more than the pull-out reference angle θ1, the control ECU 48 rotates the motor 46 backward so as to reduce the angle θ. In this case, the wind-up of the partition 32 around the partition spool 38 is released, and the partition 32 then shifts to the partitioning state of extending from the upper side to the lower side of the vehicle cabin 14 by gravity. Thereby, the pair of vehicle seats 16 are partitioned from each other. The control ECU 48 rotates the motor 46 in the reverse direction until the angle θ of the partition spool 38 reaches the pull-out reference angle θ1 unless at least the partition wind-up switch 70 is turned on while rotating the motor 46 backward. That is, the control ECU 48 rotates the motor 46 such that the angle θ of the partition spool 38 falls within a range between the pull-out reference angle θ1 and the wind-up reference angle θ2 (see a thick line in the drawing). The pull-out reference angle θ1 is set at an angle having a predetermined margin with respect to a reference angle (for example, an angle at which the longitudinal dimension of a portion of the partition 32 that extends in the vehicle cabin 14 is maximized) (see a hatched area in the drawing). Note that, also at the pull-out reference angle θ1, the partition lower end bar 40 is set so as to abut on the floor carpet 24 (see FIG. 2). The wind-up reference angle θ2 is set at an angle including a predetermined margin with respect to a limit angle of wind-up of the partition 32 (an angle at which the partition lower end bar 40 of the partition 32 abuts on the vehicle lower wall portion 34E of the partition accommodating case 34, so that further wind-up of the partition is not possible) (see the hatched area in the drawing).

Process Flow

Figure 9:
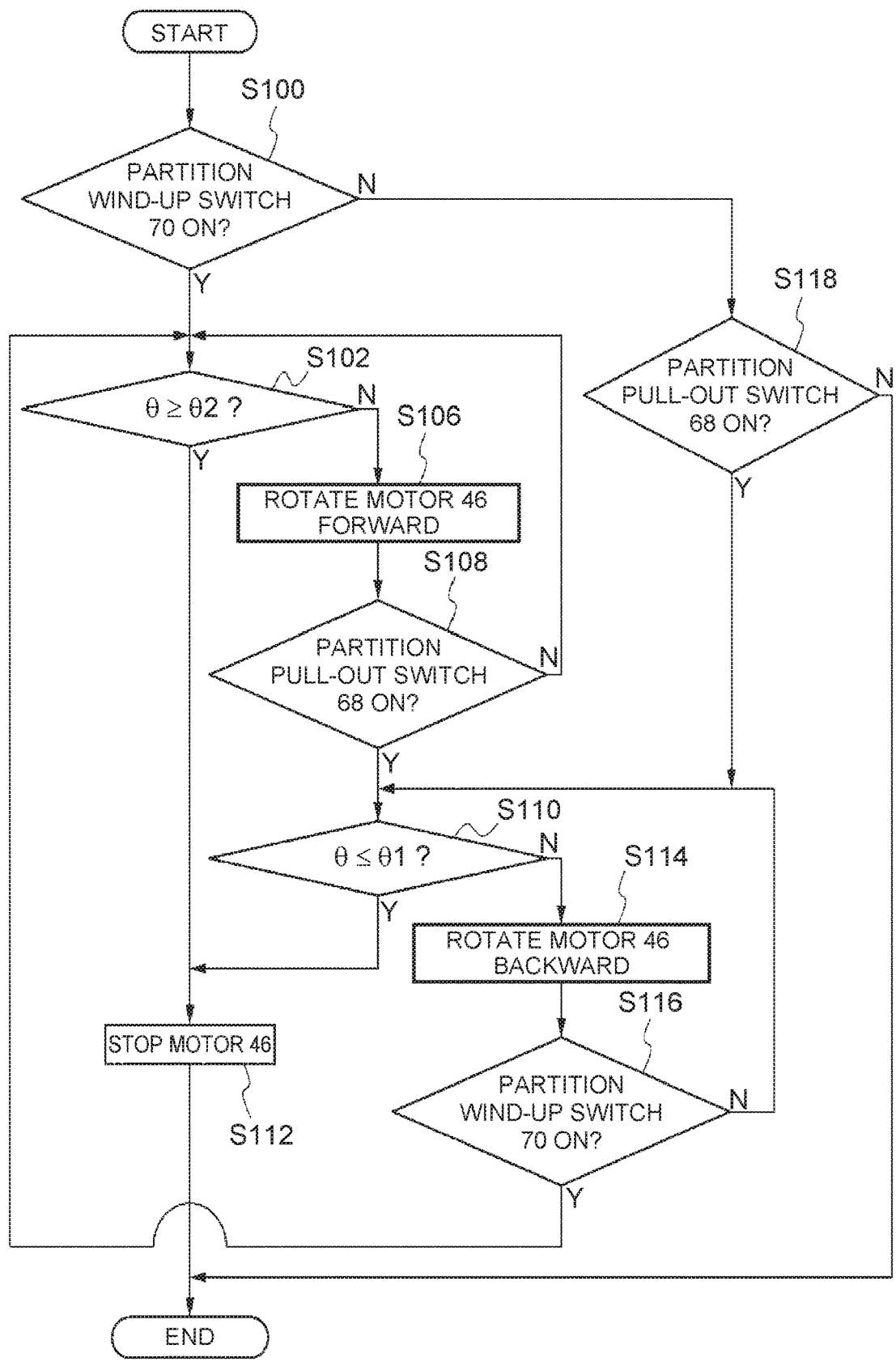
FIG. 9 is a flowchart showing a flow of motion of the vehicle cabin partitioning device according to the first embodiment.

Next, operation of the vehicle cabin partitioning device 10 will be described. FIG. 9 is a flowchart showing a flow of motion of the vehicle cabin partitioning device 10.

The CPU of the control ECU 48 determines whether or not the partition wind-up switch 70 is turned on (step S100). When the partition wind-up switch 70 is turned off (step S100: No), the CPU determines whether or not the partition pull-out switch 68 is turned on (step S118). When the partition pull-out switch 68 is turned off (step S118: No), the CPU ends the processing based on the partition operation program. When the partition pull-out switch 68 is turned on (step S118: Yes), the CPU shifts the process to step S110 described later.

On the other hand, when the partition wind-up switch 70 is turned on (step S100: Yes), the CPU determines whether or not the angle θ of the partition spool 38 is equal to or larger than the wind-up reference angle θ2 (step S102). When the angle θ is equal to or larger than the wind-up reference angle θ2 (step S102: Yes), the CPU determines that the partition 32 cannot be wound up any more, that is, the partition 32 is in the non-partitioning state, and the CPU then does not rotate the motor 46 (maintains the stopped state; step S112), and ends the processing based on the partition operation program.

When the angle θ of the partition spool 38 is smaller than the wind-up reference angle θ2 (step S102: No), the CPU rotates the motor 46 forward (step S106). Then, the CPU determines whether or not the partition pull-out switch 68 is turned on (step S108). When the partition pull-out switch 68 is turned off (step S108: No), the CPU returns the process to step S102. On the other hand, when the partition pull-out switch 68 is turned on (step S108: Yes), the CPU determines whether or not the angle θ of the partition spool 38 is less than the pull-out reference angle θ1 (step S110). When the angle θ of the partition spool 38 is smaller than the pull-out reference angle θ1 (step S110: Yes), the CPU stops the motor 46 (step S112), and ends the processing based on the partition operation program. When the angle θ of the partition spool 38 is more than the pull-out reference angle θ1 (step S110: No), the CPU rotates the motor 46 backward (step S114). Then, the CPU determines whether or not the partition wind-up switch 70 is turned on (step S116). When the partition wind-up switch 70 is turned off (step S116: No), the CPU returns the process to step S110. On the other hand, when the partition wind-up switch 70 is turned on (step S116: Yes), the CPU returns the process to step S102.

Operation and Effects of First Embodiment

Operation and effects of the present embodiment will be described, hereinafter.

In the present embodiment, as shown in FIG. 2, the partition 32 provided in the vehicle cabin 14 is disposed to extend from the upper part to the lower part of the vehicle cabin 14 so as to partition the pair of vehicle seats 16 arranged to face each other, in the partitioning state. Therefore, even when the pair of vehicle seats 16 facing each other is set to a comfortable state in which the seat back 16B of each vehicle seat 16 is greatly reclined or to a relaxed state in which each vehicle seat 16 is slid so as to widen the foot space when the occupant is seated, interference between the partition 32 in the partitioning state and the vehicle seats 16 is restrained; thus, a private space for each vehicle seat 16 can be secured by the partition 32 in the partitioning state. Further, the partition 32 in the non-partitioning state is accommodated in a predetermined position; therefore, when the occupant P is seated in only one of the pair of vehicle seats 16 or the like, the occupant P can obtain a feeling of openness by setting the partition 32 to the non-partitioning state. The partition 32 can be selectively switched by the operation switch 62 between the partitioning state and the non-partitioning state. The operation switch 62 is provided at a position where the occupant P seated in the vehicle seat 16 can visually recognize and operate the switch; therefore, the occupant P can easily switch the partition 32 between the partitioning state and the non-partitioning state. Accordingly, private spaces can be easily secured in the vehicle cabin 14, which allow the occupant to take a comfortable state or a relaxed state.

In addition, since the partition 32 is provided to extend from the ceiling 28 to the floor 20 of the vehicle cabin 14 in the partitioning state, visual lines of the occupants P seated in the respective vehicle seats 16 can be blocked and the spaces at their feet can be partitioned at the same time, to thereby more clearly separate the private spaces in the respective vehicle seats 16 from each other. Further, since the partition 32 is accommodated in the ceiling 28 of the vehicle cabin 14 in the non-partitioning state, the partition 32 can be shifted to the partitioning state using gravity, which simplifies the operation mechanism of the partition 32. Thereby, the privacy can be enhanced, and the production cost can be reduced as well.

Further, since the operation switch 62 is provided at least on the side wall portion 14A of the vehicle cabin 14, the operation switch 62 can relatively easily come into the field of view of the occupant P seated in the vehicle seat 16, which makes the operation of the operation switch 62 more easily. Thereby, the operability can be improved.

Furthermore, since the lower end 32B on the vehicle lower side can be retained on the floor 20 of the vehicle cabin 14 in the partitioning state, it is possible to restrain the partition 32 in the partitioning state from fluttering caused by a load input from the legs L of the occupant P (see FIG. 1) or by the inertia during the traveling of the vehicle.

Accordingly, the NV performance can be improved.

Further, the partition 32 can be accommodated inside the partition accommodating case 34. The partition accommodating case 34 extends in the seat width direction, and the end portions 34B on the both sides in the longitudinal direction are respectively attached to the roof side rails 44. In other words, the roof side rails 44 can be connected to each other by the partition accommodating case 34. Accordingly, bending rigidity of not only the roof side rails 44 but also of the body frames can be improved.

Next, a vehicle cabin partitioning device according to a modification of the present embodiment will be described with reference to FIG. 10. Note that the same components as those of the above-described first embodiment and the like will be denoted by the same reference numerals and description thereof will be omitted.

The vehicle cabin partitioning device 10 according to this modification has the same basic configuration as that of the first embodiment, and is characterized in that a not-shown control ECU controls the rotation speed of the motor 46 (see FIG. 6).

Figure 10:
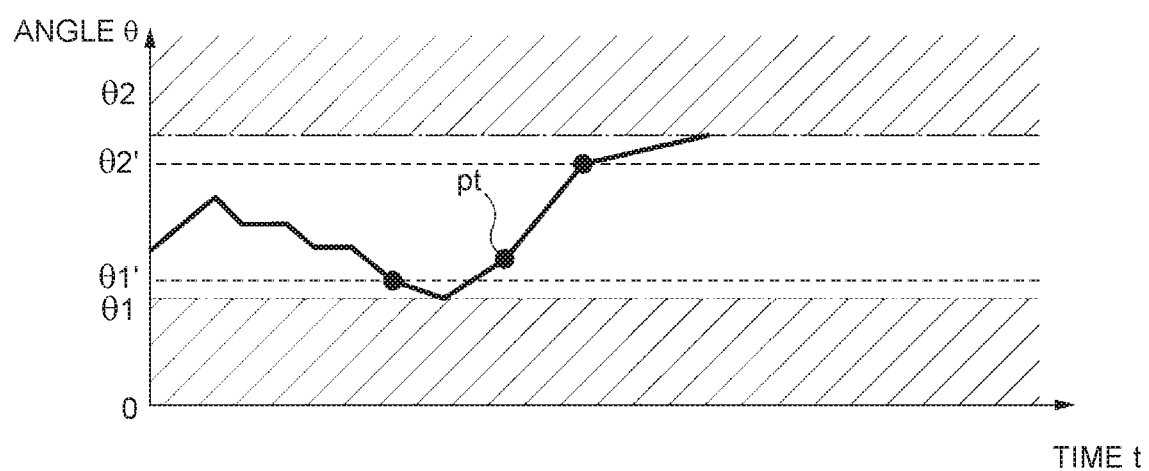
FIG. 10 is a graph showing a relationship between time and an angle of a partition spool in the operation of the vehicle cabin partitioning device according to a modification of the first embodiment.

That is, as shown in FIG. 10, the control ECU rotates the motor 46 through the PWM (pulse width modulation) control based on the angle θ of the partition spool 38 (see FIG. 6) acquired from the potentiometer 60 (see FIG. 6) and the operation of the operation switch 62 (see FIG. 6). Specifically, when the partition wind-up switch 70 is turned on and the angle θ of the partition spool 38 is smaller than the wind-up reference angle θ2, the control ECU 48 rotates the motor 46 forward to increase the angle θ. The respective rotation speeds of the motor 46 in a range between the pull-out reference angle θ1 and the deceleration threshold angle θ1' and in a range between the wind-up reference angle θ2 and the deceleration threshold angle θ2' are set to be lower than the rotation speed of the motor 46 in a range between a deceleration threshold angle θ1' and a deceleration threshold angle θ2. That is, when the partition 32 is shifted from the partitioning state to the non-partitioning state, the motion of the partition 32 can be started and stopped slowly. In addition, when the partition 32 is shifted from the non-partitioning state to the partitioning state as the partition pull-out switch 68 is turned on, the motion of the partition 32 can be started and stopped slowly, as described above. Thereby, a high-grade feeling can be produced in the motion of the partition 32.

Further, the control ECU changes the rotation speed of the motor 46 based on the time while the operation switch 62 is being operated. That is, the partition wind-up switch 70 and the partition pull-out switch 68 of the operation switch 62 are so-called momentary push button switches configured to be turned on (energized) while being pushed by the occupant P; and when the turn-on state is maintained longer than a predetermined time, it is determined that "the occupant P desires to move the partition 32 greatly", and the rotation speed of the motor 46 is increased within the range between the deceleration threshold angle θ1' and the deceleration threshold angle θ2' (see a point Pt in the drawing). Thereby, the partition 32 can be operated in accordance with the intention of the occupant P who is operating; therefore, it is possible to further improve the convenience.

Second Embodiment

Next, a vehicle cabin partitioning device according to the second embodiment of the present disclosure will be described with reference to FIG. 11, FIG. 12. Note that the same components as those of the above-described first embodiment and the like will be denoted by the same reference numerals and description thereof will be omitted.

A vehicle cabin partitioning device 80 according to the second embodiment has the same basic configuration as that of the first embodiment, and is characterized in that a guide rail 82 is provided.

Figure 11:
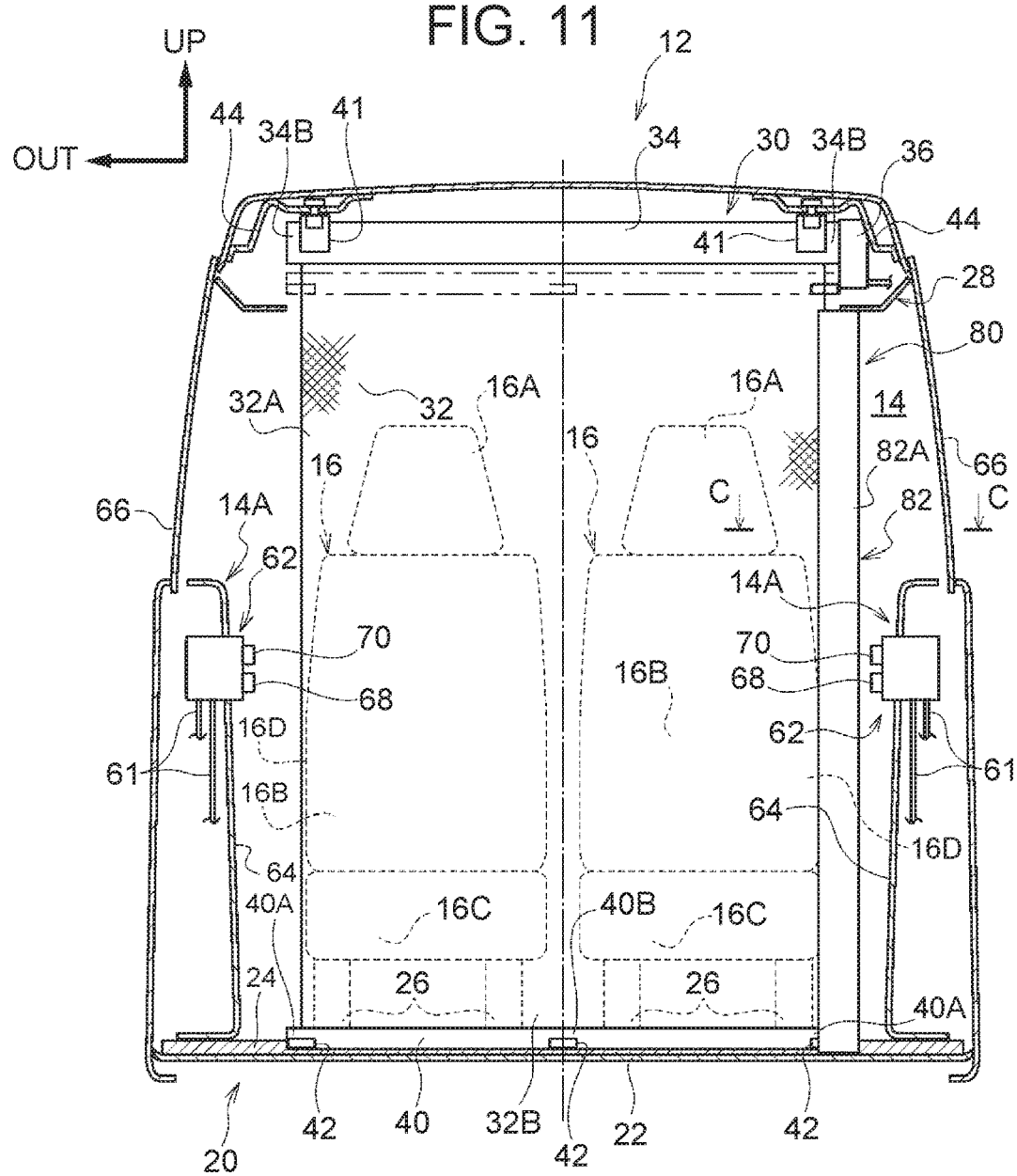
FIG. 11 is a schematic sectional view corresponding to FIG. 2 and showing a partitioning state of a vehicle cabin partitioning device according to a second embodiment.

That is, as shown in FIG. 11, the guide rail 82 is provided to extend from the ceiling 28 to the floor 20 on one side in the vehicle width direction of the vehicle cabin 14. The guide rail 82 is formed of a long member having its longitudinal direction in the vehicle height direction, and as an example, an upper end thereof is fastened to the partitioning unit 30 by fasteners (not shown). The lower end of the guide rail 82 is fastened to the floor panel 22 by fasteners (not shown).

Figure 12:
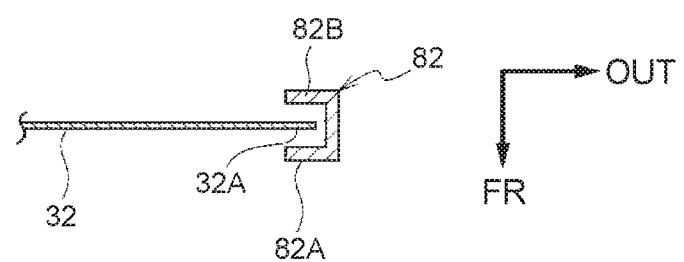
FIG. 12 is an enlarged sectional view showing a state taken along line C-C in FIG. 11.

As shown in FIG. 12, the guide rail 82 has a cross section orthogonal to the longitudinal direction and this cross section is formed in a substantially U-shape opening inward in the vehicle width direction. The end 32A on one side in the vehicle width direction of the partition 32 is accommodated in the cross-sectional shape of the guide rail 82, specifically, between a pair of side wall portions 82A, 82B in the vehicle front-rear direction of the guide rail 82. In other words, the end 32A on one side of the partition 32 is configured to overlap with the guide rail 82 as viewed in a direction perpendicular to the plane of the partition 32. In addition, since the end 32A of the partition 32 has a gap with the guide rail 82, the partition 32 is configured to be relatively movable with respect to the guide rail 82. That is, the partition 32 is movable along the guide rail 82.

Operation and Effects of Second Embodiment

Operation and effects of the second embodiment will be described, hereinafter.

Also with the above configuration, since the configuration is the same as that of the vehicle cabin partitioning device 10 of the first embodiment except that the guide rail 82 is provided, the same effects as those of the first embodiment can be obtained. The partition 32 at least partially overlaps with the guide rail 82 extending along the extending direction of the partition in the partitioning state as viewed in a direction perpendicular to the plane of the partition, so that the partition 32 is configured to be movable along the guide rail 82; thus, when the partition 32 moves, the partition 32 is restrained from being displaced in the direction perpendicular to the plane of the partition 32. Thereby, the operation of the partition 32 can be stabilized. Further, fluttering of the partition 32 when the partition 32 is in the partitioning state can be reduced by the guide rail 82. Accordingly, it is possible to cope with both improvement in stability in the operation and improvement of the NV performance.

In the present embodiment, the guide rail 82 is provided on one side of the partition 32 in the vehicle width direction; however, the present disclosure is not limited to this, and the guide rails 82 may be provided respectively to the both ends 32A in the vehicle width direction of the partition 32.

Third Embodiment

Next, a vehicle cabin partitioning device according to a third embodiment of the present disclosure will be described with reference to FIG. 13. Note that the same components as those of the above-described first embodiment and the like will be denoted by the same reference numerals and description thereof will be omitted.

A vehicle cabin partitioning device 90 according to the third embodiment has the same basic configuration as that of the first embodiment, and is characterized in that a plurality of partitions 92 that are operated individually for each pair of vehicle seats 16 are provided in the vehicle front-rear direction.

Figure 13:
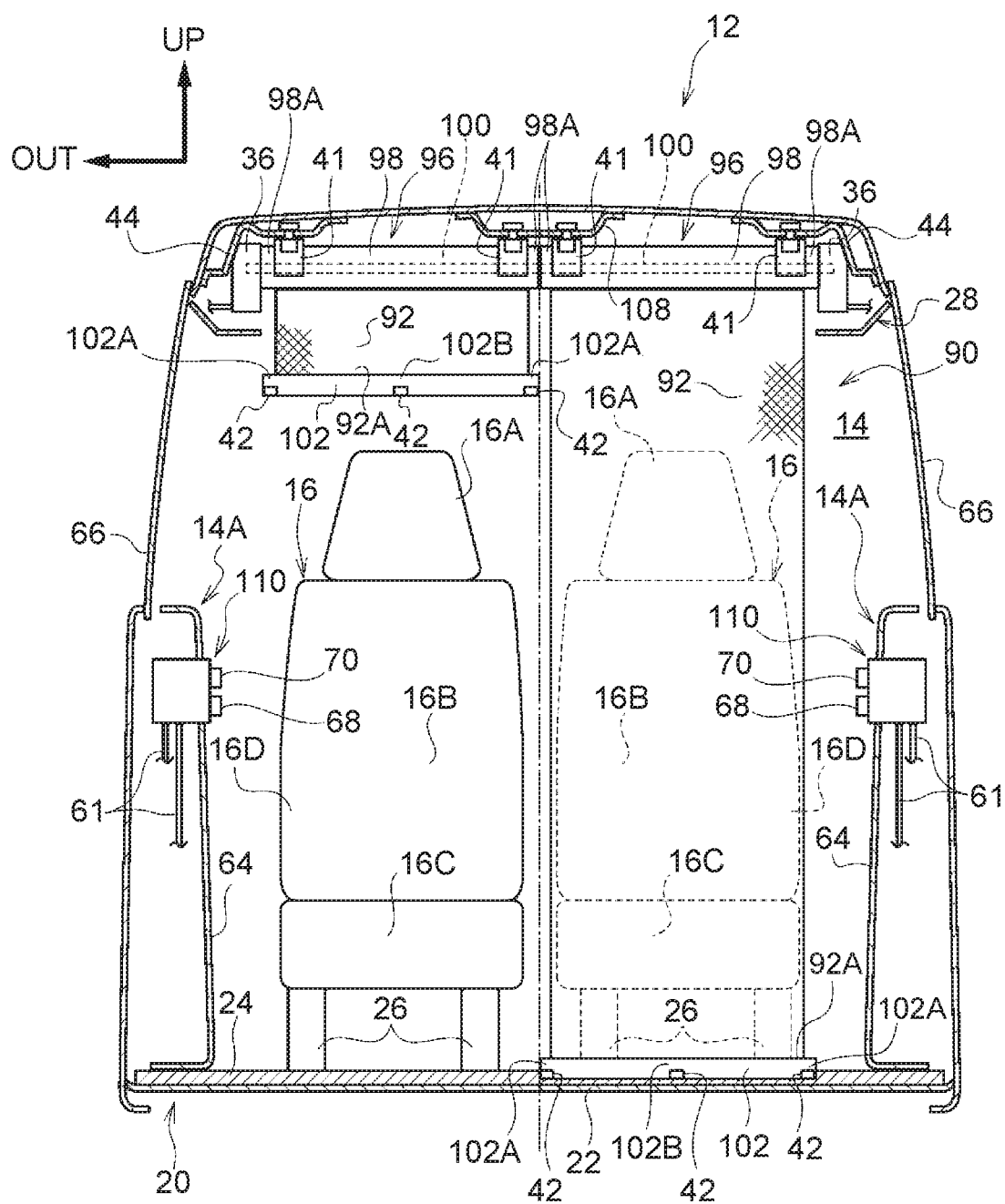
FIG. 13 is a schematic sectional view corresponding to FIG. 2 and showing a partitioning state and a non-partitioning state of a vehicle cabin partitioning device according to a third embodiment.

That is, as shown in FIG. 13, a pair of left and right partitioning units 96 is provided in the ceiling 28 of the vehicle cabin 14. Each of the partitioning units 96 includes a partition 92, a partition accommodating case 98 as a case, the partition driving mechanism 36, and a partition spool 100. The partition 92 is formed in a rectangular shape having its thickness direction in the vehicle longitudinal direction and having its longitudinal direction in the vehicle height direction, and the partition is made of a nontransparent and flexible material (for example, a vinyl sheet, etc.). The dimension of the partition 92 in the vehicle width direction is set to be substantially the same as the dimension of the vehicle seat 16 in the vehicle width direction, as viewed in a front view. The dimension in the vehicle height direction of the partition 92 is set to be not less than a dimension from the ceiling 28 to the floor 20 of the vehicle cabin 14.

A partition lower end bar 102 is provided at a lower end 92A of the partition 92. The partition lower end bar 102 is formed of a prism member having its longitudinal direction in the vehicle width direction, as with the partition lower end bar 40 (see FIG. 5) of the first embodiment; and the lower end 92A of the partition 92 is locked inside the partition lower end bar 102 by a locking configuration (not shown). In addition, the partition lower end bar 102 is provided with a plurality of locking tools 42 arranged with a distance from each other in the longitudinal direction. Specifically, the locking tools 42 are provided at both longitudinal end portions 102A on the vehicle lower side of the partition lower end bar 102 and at a longitudinal middle portion 102B on the vehicle lower side of the partition lower end bar 102, respectively. Thereby, when the partition lower end bar 102 abuts on the floor carpet 24, the locking tools 42 are locked to the floor panel 22 via the floor carpet 24 by magnetic force.

An upper end (not shown) of the partition 92 is locked to the partition spool 100. Specifically, as with the partition spool 38 of the first embodiment, the partition spool 100 is accommodated inside the partition accommodating case 98 in such a manner as to be rotatable about its axis extending in the vehicle width direction, and is formed in a columnar shape having its axial direction in the vehicle width direction, and an upper end of the partition 92 inserted inside in the radial direction is locked by a locking tool (not shown).

The partition accommodating cases 98 are each formed of a steel square tube member having its longitudinal direction in the vehicle width direction, and respective longitudinal ends 98A on one side of the cases are combined via brackets 41 to the pair of left and right roof side rails 44 partially configuring the vehicle body frames of the vehicle 12 and respective longitudinal ends 98A on the other side of the cases are combined to a roof rail 108 provided substantially at the center in the vehicle width direction.

Operation switches 110 as operation units are provided at positions close to the vehicle seats 16 of a pair of left and right center pillar garnishes 64. That is, the center pillar garnish 64 on the right side in the vehicle width direction is provided with operation switches 110 respectively at a position corresponding to the vehicle seat 16 located on the right side in the vehicle width direction and on the vehicle front side, and at a position corresponding to the vehicle seat 16 located on the right side in the vehicle width direction and on the vehicle rear side (in FIG. 13, only the operation switches 110 corresponding to the vehicle seats 16 located on the vehicle rear side is shown), among the pairs of vehicle seats 16 facing each other. In other words, on the right side in the vehicle width direction, a pair of operation switches 110 is provided in the vehicle front-rear direction (not shown). Similarly, the center pillar garnish 64 on the left side in vehicle width direction is provided with the operation switches 110 respectively at a position corresponding to the vehicle seat 16 located on the left side in the vehicle width direction and on the vehicle front side, and at a position corresponding to the vehicle seat 16 located on the left side in the vehicle width direction and the vehicle rear side, among the pairs of vehicle seats 16 facing each other. That is, the operation switches 110 are provided at positions corresponding to each of the seating positions in the vehicle cabin 14. Each operation switch 110 has the partition pull-out switch 68 and the partition wind-up switch 70, respectively.

The partition driving mechanism 36 provided for each of the partitioning units 96 is connected to the operation switches 110 on one of the left and right sides among the plurality of operation switches 110. That is, the plurality of operation switches 110 provided on the center pillar garnish 64 on the vehicle left side are connected to the partition driving mechanism 36 of the partitioning unit 96 disposed on the vehicle left side. On the other hand, the plurality of operation switches 110 provided on the center pillar garnish 64 on the vehicle right side are connected to the partition driving mechanism 36 of the partitioning unit 96 disposed on the vehicle right side. Thus, by separately operating the left and right operation switches 110, it is possible to set the partitions 92 of the pair of left and right partitioning units 96 to the partitioning state or the non-partitioning state, individually.

Operation and Effects of Third Embodiment

Operation and effects of the third embodiment will be described, hereinafter.

The above configuration also has the same configuration as that of the vehicle cabin partitioning device 10 of the first embodiment except that there is provided the plurality of partitions 92 that individually operate for each pair of vehicle seats 16 in the vehicle front-rear direction; therefore, the same effects as those in the first embodiment can be obtained. Further, among the plurality of seating positions of the vehicle seats 16, the partition 92 can be selectively set to the partitioning state or the non-partitioning state for each pair of seating positions that face each other; therefore, it is possible to set one pair of seating positions to the partitioning state and set another pair of seating positions to the non-partitioning state. That is, when one occupant P who desires to secure a private space and another occupant P who desires to communicate with others are mixed, the vehicle cabin 14 can be set to an appropriate condition in accordance with the wishes of these occupants P. Accordingly, it is possible to realize a detailed support for a condition requested by the occupants P.

Further, since the operation switches 110 are provided at positions corresponding to each of the seating positions of the vehicle seats 16, each occupant P seated at each seating position can operate the partition 92 into a desired state. Accordingly, the convenience can be enhanced.

Fourth Embodiment

Next, a vehicle cabin partitioning device according to the fourth embodiment of the present disclosure will be described with reference to FIG. 14. Note that the same components as those of the above-described first embodiment and the like will be denoted by the same reference numerals and description thereof will be omitted.

The basic configuration of the vehicle cabin partitioning device 120 according to the fourth embodiment is the same as that of the first embodiment, and is characterized in that a partition 122 can be accommodated in a side wall portion 126 on which a vehicle door 124 is not provided.

Figure 14:
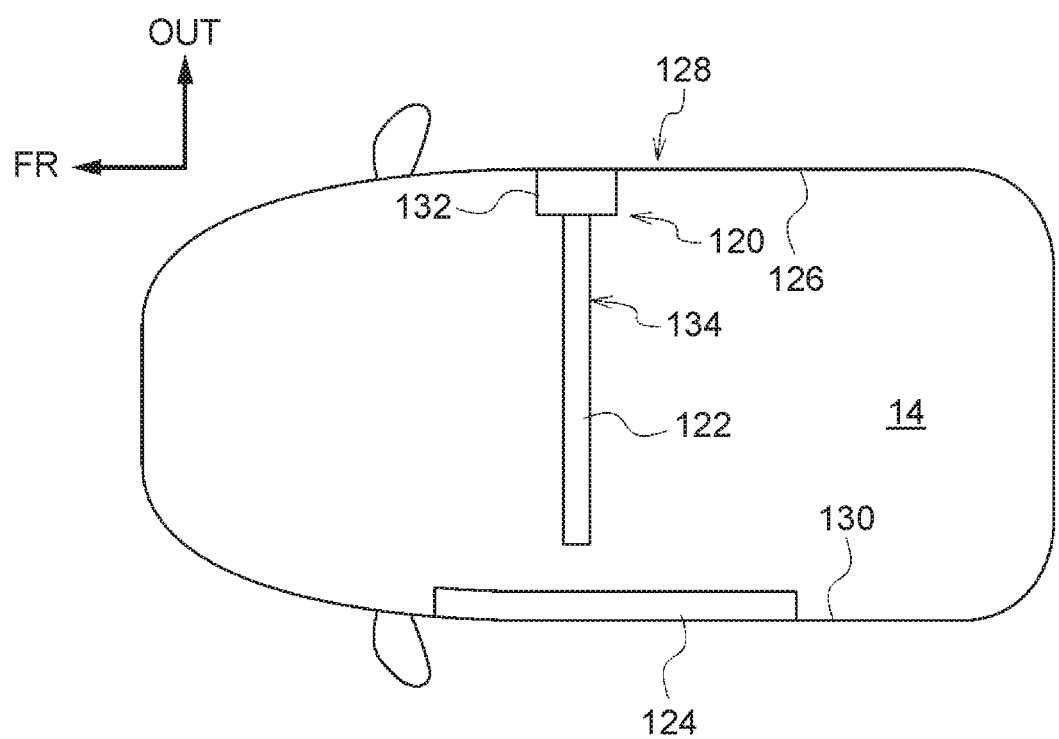
FIG. 14 is a schematic plan sectional view showing a partitioning state of a vehicle cabin partitioning device according to a fourth embodiment.

That is, as shown in FIG. 14, a vehicle 128 has the vehicle door 124 on only a side wall portion 130 of the left and right side wall portions 126, 130, and the other side wall portion 126 cannot be opened and closed. A center pillar garnish 132 is provided on the side wall portion 126 at a substantially central position in the vehicle front-rear direction, and a partitioning unit 134 is provided inside the center pillar garnish 132.

The partitioning unit 134 includes a partition 122, a driving mechanism, and guide rails (all not shown), and the partition 122 is extendable in the vehicle width direction. That is, as an example, the guide rails are provided respectively on the ceiling 28 and the floor 20 to extend in the vehicle width direction from the partitioning unit 134 toward the side wall portion 130. The partition 122 is accommodatable in a partition accommodating case (not shown) as a case, which has its longitudinal direction in the vehicle height direction, and the partition 122 is guided by the guide rails so as to be extendable in the vehicle width direction toward the side wall portion 130.

The driving mechanism of the partitioning unit 134 has an actuator and a retractable arm, and the retractable arm can expand and contract in the vehicle width direction by driving force of the actuator. An end of the partition 122 located on the side wall portion 130 side is engaged with the front end of the retractable arm, and the partition 122 can move in the vehicle width direction as the retractable arm expands and contracts. That is, the partition 122 is provided on the side wall portion 130 so as to partition the pair of vehicle seats 16 arranged to face each other in the vehicle front-rear direction.

Operation and Effects of Fourth Embodiment

Operation and effects of the fourth embodiment will be described, hereinafter.

Also with the above configuration, in the partitioning state, the partition 122 partitions the pair of vehicle seats 16 arranged to face each other; therefore, the same effects as those in the first embodiment can be obtained. Further, the partition 122 is accommodatable not in the side wall portion 130 on which the vehicle door 124 is provided but in the side wall portion 126 on which the vehicle door 124 is not provided. Therefore, the accommodating position of the partition 122 can be easily secured. Thereby, the design flexibility can be enhanced.

In the above-described embodiment, the partition 122 is extendable from the side wall portion 126 toward the side wall portion 130; however, the present disclosure is not limited to this, and the partition 122 may be extendable toward the side wall portion located on the vehicle rear side.

In addition, the partition 122 is accommodatable in the side wall portion 126 on which the vehicle door 124 is not provided, but the present disclosure is not limited to this; and the partition 122 may be configured to be accommodatable in a portion other than the vehicle door 124 on the side wall portion 130 provided with the vehicle door 124.

Further, the partition 122 is configured to extend along the guide rails provided respectively on the ceiling 28 and the floor 20, but the present disclosure is not limited to this, and the guide rail may be provided on only at least one of the ceiling 28 and the floor 20 such that the partition 122 extends along the guide rail. In accordance with this, it may be configured to provide the partition 112 in the partitioning state only within part of a range in the vehicle height direction; for example, the partition 122 in the partitioning state extends from the ceiling 28 to a position near the head of the occupant P seated in the vehicle seat 16 (see FIG. 1), or extends from the floor 20 to a position around the substantially center position in the seat height direction.

Further, in the first to fourth embodiments, the pair of vehicle seats 16 are provided so as to face each other in the vehicle front-rear direction, but the present disclosure is not limited to this, and the pair of vehicle seats 16 may be provided so as to face each other in the vehicle width direction. Correspondingly, the operation switches 62, 110 may be provided on at least one of the side wall portions (the front wall portion and the rear wall portion) in the vehicle front-rear direction. Each vehicle seat 16 is configured to have a single seating position for the seat cushion 16C, but the present disclosure is not limited to this, and each vehicle seat 16 may be configured to have a plurality of seating positions for the seat cushion 16C, like a bench seat.

Furthermore, the vehicle 12 is an autonomous driving vehicle, but the present disclosure is not limited to this, and the vehicle 12 may be applied to a manually driving vehicle. In this case, each of the partitions 32, 92, 122 may be provided at a position corresponding to a space between the vehicle seats that can be arranged to face each other except for the driver's seat, such as a space between the second row seat and the third row seat.

Furthermore, the partition driving mechanism 36 is configured to detect the angle θ and stop the rotation of the motor 46, but the present disclosure is not limited to this, and it may be configured that the occupant P visually checks the state of the partition 32 and stops the motor 46 by turning off the operation switch 62 as necessary. Further, it may be configured that a rotation speed sensor is provided in the motor 46, and the motor 46 is stopped based on the detected rotation speed of the motor 46.

The operation switches 62, 110 are provided on the center pillar garnishes 64, but the present disclosure is not limited to this, and operation switches 62, 110 may be provided on the vehicle seats 16 or at any other positions as long as the occupants P can visually recognize and operate the operation switches.

Further, it is configured that the operation switches 62, 110 have the partition pull-out switches 68 and the partition wind-up switches 70 which are push button switches, but the present disclosure is not limited to this, and the operation switches may have other configurations such as toggle switches, rocker switches, and rotary switches. Alternatively, each of the operation switches may be configured as a touch panel type operation unit operated by touching a specific part displayed on a screen of a display device previously provided.

Although the embodiments of the present disclosure have been described above, the present disclosure is not limited to the above, and it is needless to mention that various modifications other than the above can be made without departing from the spirit of the disclosure.

What is claimed is:

1. A vehicle cabin partitioning device comprising:
a partition provided in a vehicle cabin, the partition selectively shifting between a partitioning state of partitioning a pair of vehicle seats arranged to face each other and a non-partitioning state of being accommodated in a predetermined position, the partition selectively shifts between the partitioning state and the non-partitioning state for each pair of seating positions arranged to face each other among a plurality seating positions in the vehicle cabin; and
an operation unit provided at a position visible and operable for an occupant seated in the vehicle seat, the operation unit being configured to switch the partition between the partitioning state and the non-partitioning state, the operation unit is mounted at positions corresponding to each of the seating positions.

2. The vehicle cabin partitioning device according to claim 1, wherein the partition in the non-partitioning state is accommodated in a ceiling of the vehicle cabin, and the partition in the partitioning state extends from the ceiling to a floor of the vehicle cabin.

3. The vehicle cabin partitioning device according to claim 1, wherein the partition is accommodated in one side wall portion of the vehicle cabin in the non-partitioning state, and extends from the one side wall portion to the other side wall portion of the vehicle cabin in the partitioning state.

4. The vehicle cabin partitioning device according to claim 3, wherein the one side wall portion is configured to be a side wall portion having no vehicle door.

5. The vehicle cabin partitioning device according to claim 1, wherein the operation unit is provided on at least a side wall portion of the vehicle cabin.

6. The vehicle cabin partitioning device according to claim 1, wherein as viewed in a direction perpendicular to the plane of the partition, at least a part of the partition overlaps with a guide rail provided to extend along an extending direction of the partition in the partitioning state, and the partition is movable along the guide rail.

7. The vehicle cabin partitioning device according to claim 1, wherein an end on a vehicle lower side of the partition in the partitioning state is retainable on a floor of the vehicle cabin.

8. The vehicle cabin partitioning device according to claim 1, wherein the partition is accommodatable inside a case provided to extend in a seat width direction, and the case is attached to a vehicle frame at a plurality of positions in a longitudinal direction of the case.

9. A vehicle cabin partitioning device comprising:
- a partition provided in a vehicle cabin, the partition selectively shifting between a partitioning state of partitioning a pair of vehicle seats arranged to face each other and a non-partitioning state of being accommodated in a predetermined position, the partition is accommodated in one side wall portion of the vehicle cabin in the non-partitioning state, and extends from the one side wall portion to the other side wall portion of the vehicle cabin in the partitioning state, the one side wall portion is provided on a side wall of a vehicle, the side wall of the vehicle having no vehicle door; and
- an operation unit provided at a position visible and operable for an occupant seated in the vehicle seat, the operation unit being configured to switch the partition between the partitioning state and the non-partitioning state.

10. The vehicle cabin partitioning device according to claim 9, wherein the operation unit is provided on at least a side wall portion of the vehicle cabin.

11. The vehicle cabin partitioning device according to claim 9, wherein the partition selectively shifts between the partitioning state and the non-partitioning state for each pair of seating positions arranged to face each other among a plurality seating positions in the vehicle cabin.

12. The vehicle cabin partitioning device according to claim 11, wherein the operation unit is provided at positions corresponding to each of the seating positions.

13. The vehicle cabin partitioning device according to claim 9, wherein as viewed in a direction perpendicular to the plane of the partition, at least a part of the partition overlaps with a guide rail provided to extend along an extending direction of the partition in the partitioning state, and the partition is movable along the guide rail.

14. A vehicle cabin partitioning device comprising:
- a partition provided in a vehicle cabin, the partition selectively shifting between a partitioning state of partitioning a pair of vehicle seats arranged to face each other and a non-partitioning state of being accommodated in a predetermined position, the partition is accommodated in one side wall portion of the vehicle cabin in the non-partitioning state, and extends from the one side wall portion to the other side wall portion of the vehicle cabin in the partitioning state, the partition extends from the one side wall portion to the other side wall portion in a vehicle width direction; and
- an operation unit provided at a position visible and operable for an occupant seated in the vehicle seat, the operation unit being configured to switch the partition between the partitioning state and the non-partitioning state.

15. The vehicle cabin partitioning device according to claim 14, wherein the operation unit is provided on at least one of the one side wall portion and the other side wall portion of the vehicle cabin.

16. The vehicle cabin partitioning device according to claim 14, wherein the partition selectively shifts between the partitioning state and the non-partitioning state for each pair of seating positions arranged to face each other among a plurality seating positions in the vehicle cabin.

17. The vehicle cabin partitioning device according to claim 16, wherein the operation unit is provided at positions corresponding to each of the seating positions.

18. The vehicle cabin partitioning device according to claim 14, wherein as viewed in a direction perpendicular to the plane of the partition, at least a part of the partition overlaps with a guide rail provided to extend along an extending direction of the partition in the partitioning state, and the partition is movable along the guide rail.

\* \* \* \* \*